Aug. 10, 1965

A. SAMMS 3,199,455

MULTIPLE STAGE ROCKET

Filed Jan. 23, 1964

INVENTOR.
Adolphus Samms
BY: Harry M. Saragovitz,
Edward J. Kelly &
Herbert Berl Aug. 10, 1965

A. SAMMS 3,199,455

MULTIPLE STAGE ROCKET

Filed Jan. 23, 1964

INVENTOR.
Adolphus Samms
BY: Harry M. Saragovitz,
Edward J. Kelly &
Herbert Berl

United States Patent Office 3,199,455
Patented Aug. 10, 1965

3,199,455
MULTIPLE STAGE ROCKET
Adolphus Samms, Yuma Test Station, Ariz.
Filed Jan. 23, 1964, Ser. No. 339,832
2 Claims. (Cl. 102—49)
(Granted under Title 35, U.S. Code (1952), sec. 266)

The invention described herein may be manufactured and used by or for the Government for governmental purposes, without the payment to me of any royalty thereon.

This invention relates to a multiple stage rocket and more particularly to a conventional rocket having the fuel and oxidizer tanks concentrically arranged about its outer peripheral surface.

In the construction of multiple stage rockets, it is customary to stack the stages in axial alignment, which arrangement necessitates a rather long weapon. Also, since each stage must be jettisoned from the rocket as it was burnt out to conserve weight, it was necessary to provide an air frame for the support of the several stages. Such an example of an air frame is disclosed in my U.S. Patent No. 3,048,107, wherein the rocket is provided with a single combustion chamber slidable on a pair of supporting frame shafts 22.

The present invention eliminates this air frame and its attendant weight by arranging semicircular tanks containing the propellants concentrically about the rocket.

It is therefore an object of this invention to provide a rocket in which air frame support shafts are eliminated to shorten the length of the rocket and to conserve weight.

It is another object to arrange expendable, semicircular liquid propellant tanks concentrically about the peripheral surface of a conventional rocket.

A further object is to provide automatically detachable fluid connections between the concentrical tanks and the motor of the conventional rocket.

A final object is to provide a multiple stage rocket, simple in construction and possessing great economy.

The specific nature of the invention as well as other objects and advantages thereof, will clearly appear from a description of a preferred embodiment as shown in the accompanying drawings, in which.

Figure 1:
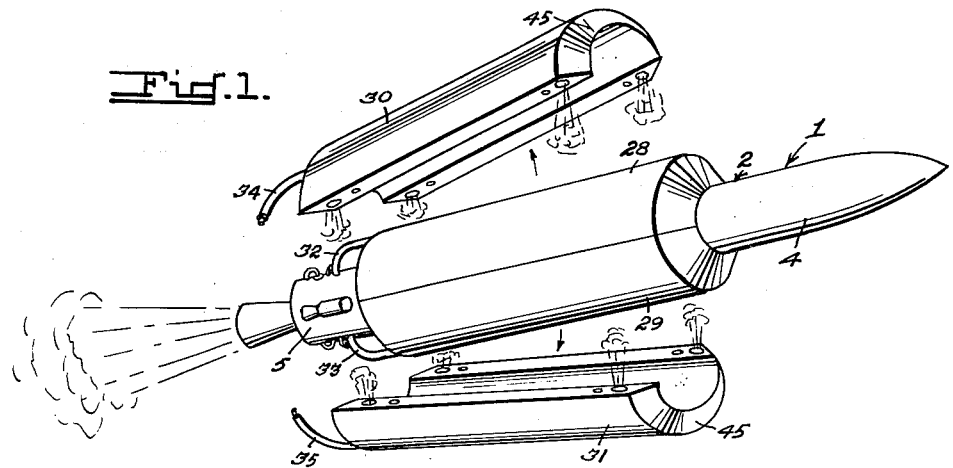
FIG. 1 is a perspective view of the rocket of the invention in flight, the first stage tanks being jettisoned from the second stage.
Figure 2:
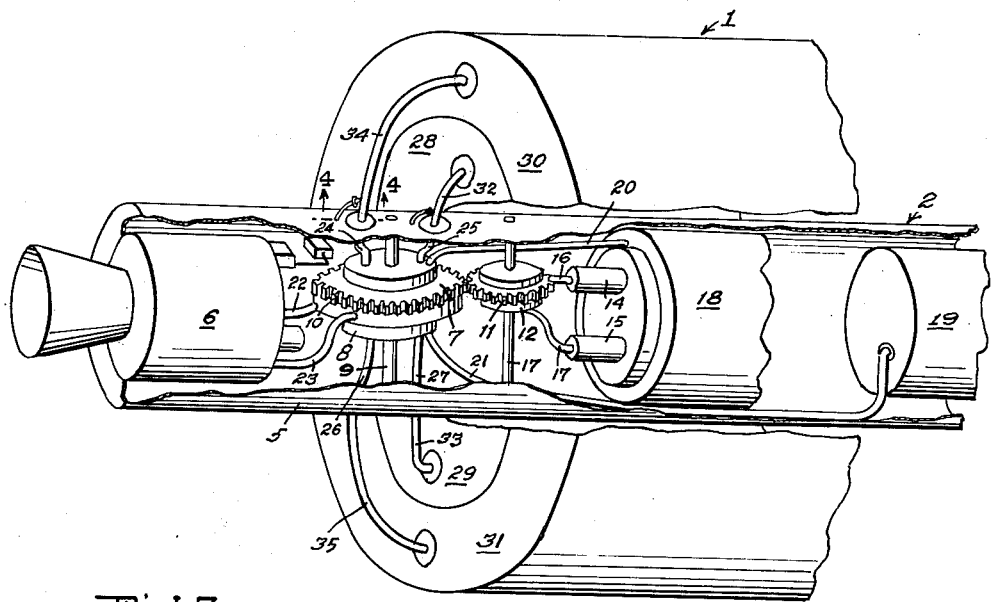
FIG. 2 is a fragmentary perspective view of the rearward portion of the rocket with the rocket's skin cut away to reveal the fueling arrangement.

Referring in particular to the drawing, reference character 1 denotes the multiple stage rocket in its entirety.

A conventional tubular rocket is indicated generally by 2 and includes a warhead 4, a body 5 and a combustion chamber 6.

A pair of pumps 7 and 8 are mounted on a common shaft 9 and a gear 10 encircles pumps 9 and 10 to mesh with a gear 11 encircling a turbine 12 mounted on a common shaft 13.

A pair of solid propellants 14 and 15 are connected to turbine 12 by lines 16 and 17.

Fuel tank 18 and oxidizer tank 19 in the conventional rocket 2 form the third stage of the multiple rocket 1.

Lines 20 and 21 connect the tanks 18 and 19 with pumps 7 and 8 respectively.

Lines 22 and 23 connect pumps 7 and 8 to combustion chamber 6.

Inlet lines 24, 25, 26 and 27 lead from pumps 7 and 8 respectively to the outside periphery of body 5.

As illustrated in the drawing, first and second stages encircle the rocket 2. While only two sets of tanks are shown, more can be applied as desired. The second stage tanks 28 and 29 fit like a collar about the tubular body 5 of rocket 2 and the first stage tanks 30 and 31 encircle second stage tanks 28 and 29 as shown best in FIG. 7. Tanks 28 and 30 contain fuel, while tanks 29 and 31 contain an oxidizer.

Tanks 28 and 29 are detachably connected to lines 25 and 27 by flexible lines 32 and 33 respectively, tanks 30 and 31 are connected by flexible lines 34 and 35 respectively.

Figure 6:
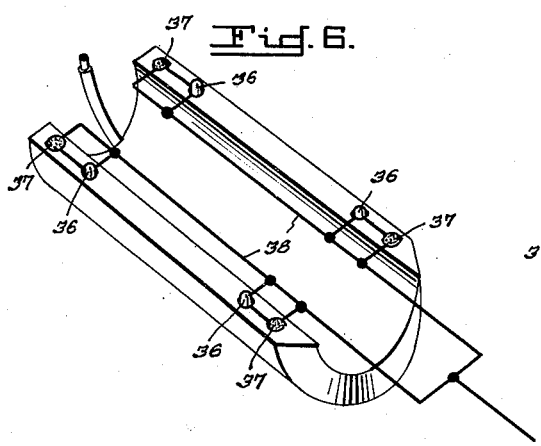
FIG. 6 is a view of the inner side of one of the semicircular tanks.

Means are provided for holding the tank halves 28–31 together and to jettison them from the conventional rocket 2 when spent to conserve weight. These means are shown in FIG. 6 wherein one tank half is illustrated, the remaining halves being of similar construction.

Reference character 36 designates the means for securing the tanks in assembled relation on the conventional rocket 2 which may consist of explosive bolts. The jettisoning means consist of explosive charges 37 carried by the tank halves. The explosive bolts 36 and charges 37 are connected by electrical leads 38 which are connected to the rocket's electrical programmer system (not shown).

Figure 7:
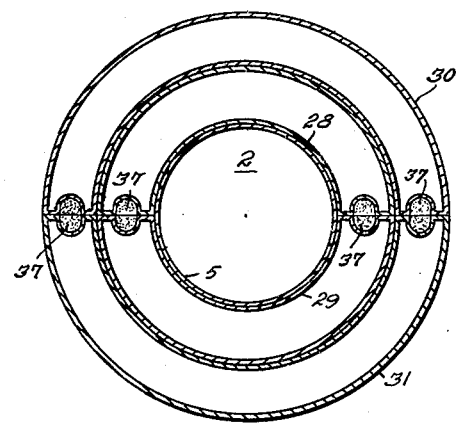
FIG. 7 is a section view taken along line 7—7 of FIG. 3 with internal mechanism left out for sake of clarity.

Other holding means may be used, if desired, such as solenoid operated latches as shown in FIG. 7 of my U.S. Patent No. 3,048,107.

The tank halves 28–31 are beveled as at 45 on their forward ends to cut down wind resistance.

Figure 4:
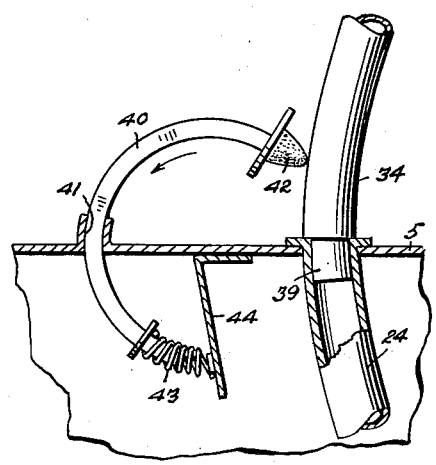
FIG. 4 is a detail section view of one of the spring loaded plugs in its retracted position and a fuel line connected to the pump line and taken along line 4—4 of FIG. 2.
Figure 5:
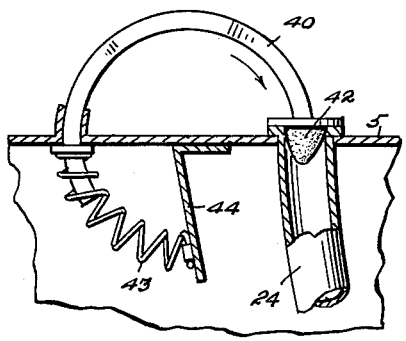
FIG. 5 is a similar view, the fuel line pulled out of connection and the plug closed.

Means are further provided to close off inlet lines 24–27 when flexible lines 32–35 are separated therefrom by jettisoning of tanks 28–31. These means are shown in FIGS. 4 and 5. The means are alike for all connections of lines 32–35.

In FIG. 4, flexible line 34 has a nipple 39 which fits into inlet line 24. An arcuate arm 40 is slidably mounted in opening 41 in body 5. Arm 40 is provided with a plug 42 at its outer end. This plug may be of rubber or like composition for sealing purposes. Arm 40 is biased by a spring 43 at its inner end, the spring 43 being attached to a bracket 44.

OPERATION

Figure 3:
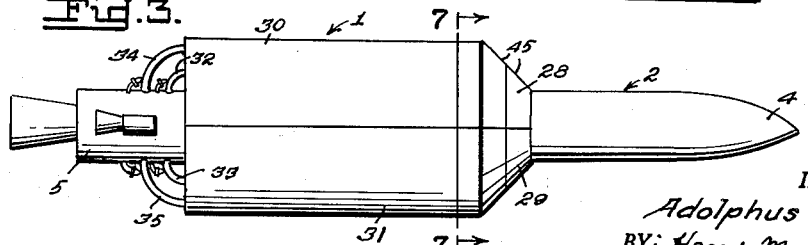
FIG. 3 is a side elevation of the rocket in assembled condition.

The multiple stage rocket is, of course, assembled as shown in FIG. 3 before blast-off.

Charges of solid propellant 14 and 15 are fired by electricity from the flight programmer (not shown) which controls the electric mechanism (also not shown) to start the turbine 12. Gear 11 turns gear 10 on pumps 7 and 8. By means of suitable valves or the like (not shown) fuel and oxidizer from tanks 30 and 31 of the first stage is then pumped through lines 34, 35, 24 and 26 and lines 22 and 23 into rocket motor 6. The turbine 12 is rotated by combustion gases from rocket motor 6 by means (not shown). Such a turbine is shown in my U.S. Patent No. 3,000,179. Valve arrangements similar to the aforesaid may also be employed for the second stage tanks (not shown).

When the fuel and oxidizer is spent from the first stage, it becomes necessary to jettison the semicircular tanks 30 and 31. This is done by firing the explosive bolts 36 and charges 37 by the aforesaid flight programmer.

As tanks 30 and 31 are blown apart and away from tanks 28 and 29 (second stage) flexible lines 34 and 35 are pulled out of inlet lines 24 and 25, permitting spring 43 to urge arm 40 in a clockwise direction so that plug 42 will close inlet line 24 as seen in FIG. 5.

The second stage, comprising tanks 28 and 29 are similarly jettisoned after they are spent and the respective inlet lines closed.

After the first and second stages have been jettisoned, the fuel tank 18 and oxidizer tank are used through lines 20 and 21 to pumps 7 and 8 and to the combustion chamber 6 and the rocket 2 continues in flight until the tanks are spent.

While only two sets of semicircular tanks are shown, other tanks could be added to prolong the flight of the conventional rocket 2.

The fuel flow of the tanks will, of course, be regulated by appropriate valving, such as for instance, solenoid-operated valves to open or shut off lines 32–35 (not shown).

It is therefore apparent that the invention provides a shorter rocket, elimination of heavy air frames the provision of a simpler booster arrangement.

Variations and modifications may be effected without departing from the scope of the novel concept of the present invention as set forth in the appended claims.

What is claimed is:

1. A multistage rocket comprising in combination with a conventional rocket including a tubular body containing a combustion chamber, a liquid propellant source, a pumping system in fluid connection between said propellant source and said chamber for pumping said propellant to said chamber and fluid inlet lines communicating between said pumping system and the outside peripheral surface of said tubular body, said conventional rocket forming the last stage of said multistage rocket; pairs of semicircular liquid propellant tank halves secured together and arranged in concentric relation about said conventional rocket and each pair of tank halves forming a successive stage of said multistage rocket, the outermost pair being the first stage; a detachable fluid line connecting each said tank half with a said inlet line; means carried by said tank halves for jettisoning said pairs of tank halves in succession upon exhaustion of the propellant therein by said pumping system, and means for automatically closing said inlet lines comprising an arcuate, spring biased arm slidably mounted in the wall of said tubular body and a plug carried by the outer end of said arm, said arm moving said plug into a said inlet line to seal it when a said fluid line has been withdrawn by jettison of its respective tank half.

2. A multistage rocket as claimed in claim 1 wherein said means for jettisoning said tank halves comprises an explosive charge carried by the inner face of each semicircular tank half.

References Cited by the Examiner

UNITED STATES PATENTS

| | | | |
|---|---|---|---|
| 2,686,473 | 8/54 | Vogel | 102—49 |
| 2,962,934 | 12/60 | Seidner | 89—1.7 |
| 3,048,107 | 8/62 | Samms | 102—49 |

SAMUEL FEINBERG, *Primary Examiner.*